US009689554B1

(12) United States Patent
Householder et al.

(10) Patent No.: US 9,689,554 B1
(45) Date of Patent: *Jun. 27, 2017

(54) ASYMMETRIC AREA LIGHTING LENS

(71) Applicant: Universal Lighting Technologies, Inc., Madison, AL (US)

(72) Inventors: John R. Householder, Cedar Park, TX (US); Megan Tidd, Arvada, CO (US)

(73) Assignee: Universal Lighting Technologies, Inc., Madison, AL (US)

( * ) Notice: Subject to any disclaimer, the term of this patent is extended or adjusted under 35 U.S.C. 154(b) by 85 days.

This patent is subject to a terminal disclaimer.

(21) Appl. No.: 14/708,552

(22) Filed: May 11, 2015

Related U.S. Application Data

(60) Provisional application No. 61/991,924, filed on May 12, 2014.

(51) Int. Cl.
| | | |
|---|---|---|
| *F21V 5/08* | (2006.01) | |
| *F21V 5/04* | (2006.01) | |
| *F21Y 101/02* | (2006.01) | |

(52) U.S. Cl.
CPC ............. *F21V 5/08* (2013.01); *F21V 5/045* (2013.01); *F21Y 2101/02* (2013.01)

(58) Field of Classification Search
CPC ... F21V 5/00; F21V 5/04; F21V 5/041; F21V 5/043; F21V 5/045; F21V 5/046; F21V 5/048; F21V 5/08; F21V 13/04
See application file for complete search history.

(56) References Cited

U.S. PATENT DOCUMENTS

| | | | |
|---|---|---|---|
| 6,837,605 B2 | 1/2005 | Reill | |
| 7,618,163 B2 | 11/2009 | Wilcox | |
| 7,841,750 B2 | 11/2010 | Wilcox et al. | |
| 7,891,835 B2* | 2/2011 | Wilcox | F21V 5/04 |
| | | | 362/245 |
| 7,942,559 B2 | 5/2011 | Holder et al. | |
| 8,287,150 B2* | 10/2012 | Schaefer | F21V 5/007 |
| | | | 362/237 |
| 8,434,912 B2* | 5/2013 | Holder | F21K 9/00 |
| | | | 362/245 |
| 8,628,222 B2* | 1/2014 | Kelley | F21V 5/002 |
| | | | 362/311.06 |
| 9,234,650 B2* | 1/2016 | Dieker | F21V 13/04 |
| 2012/0307495 A1* | 12/2012 | Shih | G02B 19/0066 |
| | | | 362/237 |

* cited by examiner

*Primary Examiner* — Robert May
(74) *Attorney, Agent, or Firm* — Patterson Intellectual Property Law, P.C.; Mark J. Patterson; Jerry Turner Sewell

(57) ABSTRACT

A lens for distributing light from a light emitter in a desired asymmetric illumination profile includes a lens body having an input side and an output side. The input side receives light from an emitter, and the output side includes primary refractive surface, total internal reflection surfaces, and a secondary refractive surface associated with the total internal refection surfaces. A primary emission axis associated with the emitter is defined through the lens body, and a transverse reference plane is positioned parallel to the primary emission axis. A desired illumination region is located on a first side of the reference plane, and a desired dark region is located on a second side of the reference plane. The primary refractive surface, the total internal reflection surfaces and the secondary refractive surface direct a substantial portion of the light from the emitter to the desired illumination region.

7 Claims, 9 Drawing Sheets

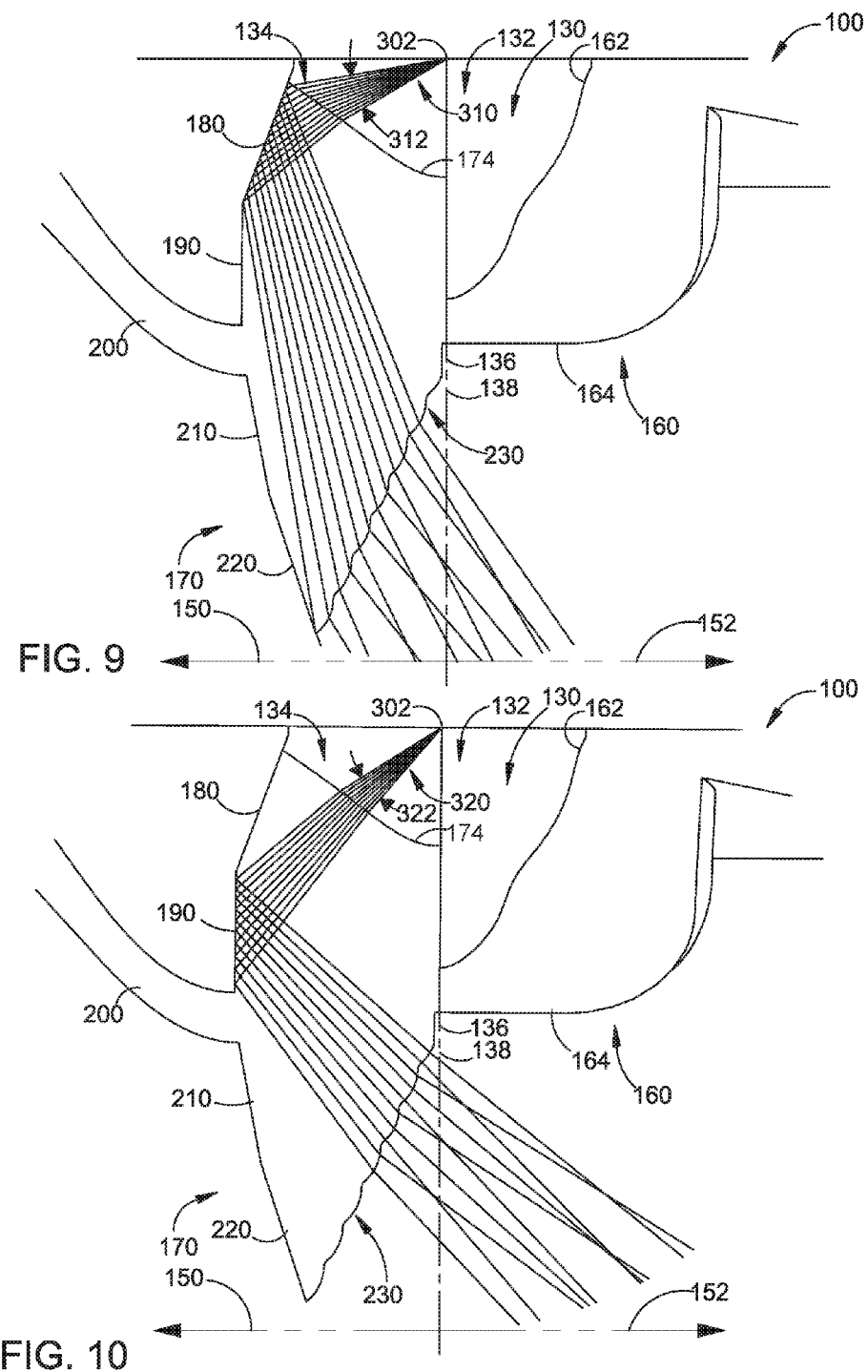

ASYMMETRIC AREA LIGHTING LENS

RELATED APPLICATIONS

This application claims benefit of U.S. Provisional Patent Application No. 61/991,924, filed May 12, 2014, entitled "Proximal Shape Configurations for an Asymmetric Area Lighting Lens," which is hereby incorporated by reference in its entirety.

BACKGROUND OF THE INVENTION

Field of the Invention

The present invention relates generally to lighting products and more particularly to optical lens devices, lighting systems, and associated methods for asymmetrically distributing light into an environment.

Description of the Related Art

Lighting systems based on light-emitting diodes (LEDs) are replacing conventional incandescent lights and fluorescent lights in many locations. Recently, linear lighting fixtures based on a plurality of lineally aligned LEDs are starting to replace fluorescent tubes for overhead fixtures. Unlike fluorescent tubes, which generally emit light uniformly about a cylinder, the LEDs of a linear lighting fixture are generally directional light sources that produce light over a relatively narrow range of angles rather than over a broad area. Thus, LED-based fixtures include additional components to redirect and diffuse the light to provide more uniform lighting. The additional components tend to be large and add considerable size and weight to what would otherwise be a small light fixture.

Conventional lighting products for illuminating environments typically include a light emitter such as a bulb or light emitting diode (LED) and a lens. Light emitted by the emitter is distributed in a desired pattern into the environment by the lens. In many applications, it is generally desirable to emit light in an asymmetric profile such that more light is distributed by the lens into a desired direction, and less light is distributed into non-preferred directions. Such applications for asymmetric lighting include street lighting where it is desirable to maximize the amount of light projected toward the street, but to minimize the amount of light projected away from the street toward nearby houses or buildings. Numerous other applications where asymmetric lighting profiles are desired from emitter and lens combinations are generally known in the art for both indoor and outdoor applications.

Asymmetric light distribution may be achieved in a variety of ways. For example, conventional devices for projecting light in a given direction include mechanical reflectors or shields that intercept light rays and redirect those light rays in a desired direction. Reflectors often have a polished surface to improve surface reflectivity to more efficiently reflect incident light. However, reflectors are often inadequate for many asymmetric lighting applications because they absorb photons and reduce lighting efficiency. Additionally, reflectors may become hot during use or may become damaged or misaligned, resulting in uneven light distribution profiles. Reflectors also may be expensive to produce and align in a mass production environment.

Others have attempted to overcome the problems of efficiently distributing emitted light in an asymmetric profile by providing a shaped lens over an emitter. The shaped lens may include a transparent or semi-transparent material having one or more exterior refractive surfaces. Emitted light travels through the lens material and is redirected in a desired direction upon contact with the exterior refractive surface.

One problem with conventional asymmetric lens devices is the use of primarily refractive exterior surfaces for distributing light asymmetrically. The use of refractive surfaces for the majority of light control often requires additional mechanical shields or reflectors to block light inadvertently distributed toward the desired dark region, or house side, of a lighting system. As such, conventional systems may require two components—a primarily refractive lens and a mechanical shield or reflector—for achieving satisfactory asymmetric light distribution. Additionally, conventional asymmetric lens devices do not achieve optimal efficiency and do not minimize unwanted light emission toward the desired dark regions.

SUMMARY OF THE INVENTION

Improvements are needed in asymmetric area lighting devices, optical lenses and associated methods. An aspect of the embodiments disclosed herein is a lens for distributing light from a light emitter in a desired asymmetric illumination profile includes a lens body having an input side and an output side. The input side receives light from an emitter. The output side includes a primary refractive surface, one or more total internal reflection surfaces, and a secondary refractive surface associated with the total internal refection surfaces. A primary emission axis associated with the emitter is defined through the lens body, and a transverse reference plane is positioned parallel to the primary emission axis. A desired illumination region is located on a first side of the reference plane, and a desired dark region is located on a second side of the reference plane. The primary refractive surface, the total internal reflection surfaces and the secondary refractive surface direct a substantial portion of the light from the emitter to the desired illumination region.

Another aspect of the embodiments disclosed herein is an optical lens apparatus for distributing light from a light emitter. The apparatus comprises a lens body having an input side and an output side. The input side of the lens body is positionable to receive light from the light emitter. The light from the light emitter includes at least first and second portions of light. The first portion of light is initially directed into a first region of the lens body; and the second portion of light is initially directed into a second region of the lens body. A first refractive output surface is positioned on the output side of the first region of the lens body. The first refractive output surface refracts the first portion of the light from the light emitter to direct the first portion of the light to a desired illumination region. A total internal reflection surface is positioned on the output side of the second region of the lens body. The total internal reflection surface reflects the second portion of the light from the light emitter. A second refractive output surface is also positioned on the output side of the second region of the lens body. The second refractive surface comprises a plurality of refractive elements. The refractive elements of the second refractive surface receive the second portion of light reflected by the total internal reflection surface and refract the second portion of light to the desired illumination region.

In certain embodiments, the total internal reflection surface comprises a plurality of substantially planar adjacent longitudinal faces.

In certain embodiments, the apparatus further comprises an emitter recess formed in the input side of the lens body.

The lens body includes a primary emission axis aligned with the emitter when the emitter is installed in the emitter recess. A transverse reference plane extends through the primary emission axis. The transverse reference plane has a first side and a second side. The first region of the lens body is on the first side of the transverse reference plane; and the second region of the lens body is on the second side of the transverse reference plane. The desired illumination region is located on the first side of the reference plane; and a desired dark region is located on the second side of the reference plane. The total internal reflection surface and the second refractive surface are positioned entirely in the desired dark region on the second side of the reference plane. In certain embodiments, the lens body is operable to distribute a substantial portion of the transmitted light from the emitter recess into the desired illumination region.

In certain embodiments of the apparatus, the plurality of refractive elements comprise a plurality of spaced apart arcuate convex elements with a respective arcuate concave element positioned between adjacent arcuate convex elements. In particular embodiments, the plurality of refractive elements comprise seven convex refractive elements and six concave refractive elements. In an illustrated embodiment, the convex refractive elements have a total arc length approximately 5.4 times a total arc length of the concave refractive elements.

In certain embodiments, the optical lens apparatus comprises a plurality of the lens bodies mounted on a common lens support platform with each of the lens bodies positioned to direct light toward the desired illumination region.

Another aspect of the embodiments disclosed herein is an optical lens apparatus for asymmetrically distributing light from an emitter toward a desired illumination region and away from a desired dark region. The lens apparatus comprises a lens body having an input side and an output side. A reference plane extends through the lens body from the input side to the output side. The reference plane has a first side and a second side, and separates the lens body into a first lens body portion on the first side of the reference plane and a second lens body portion on the second side of the reference plane. The desired illumination region is located on the first side of the reference plane; and the desired dark region located on the second side of the reference plane. A first refractive surface is located on the first lens body portion to refract a first portion of light from the emitter toward the desired illumination region. A total internal reflection surface is located on the second lens body portion. The total internal reflection surface is configured to reflect transmitted light from the emitter incident on the total internal reflection surface. A second refractive surface is located on the second lens body portion. The second refractive surface comprises a plurality of refractive elements configured to refract light from the total internal reflection surface toward the desired illumination region.

In certain embodiments of the lens apparatus, the total internal reflection surface comprises a plurality of substantially planar adjacent longitudinal faces.

In certain embodiments of the lens apparatus, the first refraction surface includes a convex profile. In an illustrated embodiment, the second refraction surface comprises a plurality of arcuate convex ridges. In the illustrated embodiment, adjacent arcuate ridges are spaced apart by a respective arcuate concave valley.

In certain embodiments of the lens apparatus, a primary emission axis is aligned with the emitter and extends through the lens body; and the reference plane is parallel to the primary emission axis. In the illustrated embodiment, the reference plane is coextensive with the primary emission axis.

Another aspect of the embodiments disclosed herein is a lighting apparatus for distributing light asymmetrically into an environment toward a desired illumination region and away from a desired dark region. The lighting apparatus comprises a light-emitting diode (LED) emitter having a primary emission axis. An optical lens is positioned on the emitter such that the primary emission axis extends through the optical lens. The optical lens has a transverse reference plane parallel to the primary emission axis. The transverse reference plane has a first side and a second side. The optical lens includes a first refractive surface on the first side of the transverse reference plane and includes a total internal reflection surface on the second side of the transverse reference plane. The total internal reflection surface is configured to reflect light incident on the total internal reflection surface. The optical lens includes a second refractive surface on the second side of the transverse reference plane. The second refractive surface comprises a plurality of refractive elements. Light reflected by the total reflective surface is refracted by the refractive elements of the second refractive surface toward the desired illumination region. The desired illumination region is on the first side of the transverse reference plane; and the desired dark region is on the second side of the transverse reference plane.

In certain embodiments, the total internal reflection surface includes at least two substantially planar longitudinal faces.

In certain embodiments, the plurality of refractive elements comprise a plurality of convex ridges. Adjacent convex ridges are spaced apart by a respective concave valley. The diameters and angular spans of the ridges and valleys are selected such that the ridges have a longer total arc length than a total arc length of the valleys.

Another aspect of the embodiments disclosed herein is an optical lens that can be manufactured in a straight-pull injection molding tooling system.

Numerous other objects, features and advantages of the present invention will be readily apparent to those skilled in the art upon a reading of the following disclosure when taken in conjunction with the accompanying drawings.

BRIEF DESCRIPTION OF THE DRAWINGS

The foregoing aspects and other aspects of this disclosure are described in detail below in connection with the accompanying drawing figures in which:

FIG. 9 illustrates the enlarged cross-sectional view of FIG. 7 with a plurality of light paths representing a first set of rays from the second emitter recess region, the light paths showing total internal reflection of the first set of rays by the first total internal reflection surface in the protruding lens structure and refraction of the first set of rays by the plurality of refractive elements on the secondary refractive surface;

FIG. 10 illustrates the enlarged cross-sectional view of FIG. 7 with a plurality of light paths representing a second set of rays from the second emitter recess region, the light paths showing total internal reflection of the second set of rays by the second total internal reflection surface in the protruding lens structure and refraction of the second set of rays by the plurality of refractive elements on the secondary refractive surface;

DETAILED DESCRIPTION OF PREFERRED EMBODIMENTS

Figure 1:
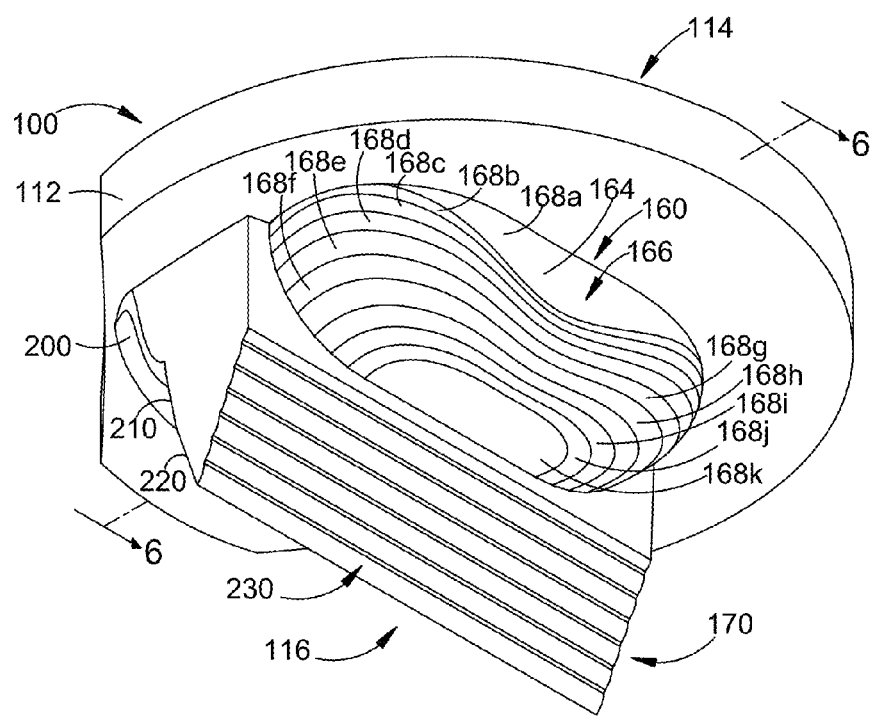
FIG. 1 illustrates a perspective view of an embodiment of a lens apparatus having a plurality of refractive elements on the secondary refractive surface, the view looking up at the front (proximal portion) of the output side of the lens apparatus.

The following description includes references to various directional words (e.g., upper and lower; front and rear; uppermost and lowermost; proximal and distal; and the like). Such references are intended to facilitate the description in accordance with the depicted orientations of the drawing figures and are not intended to be limiting unless specifically noted.

Figure 2:
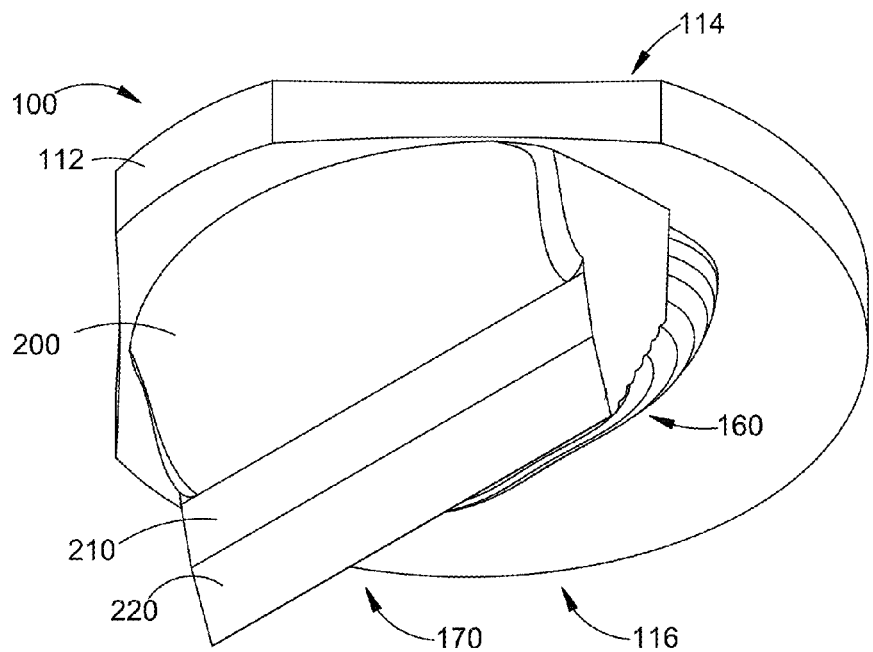
FIG. 2 illustrates a perspective view of the lens apparatus of FIG. 1 looking up at the rear (distal portion) of the output side of the lens apparatus.
Figure 3:
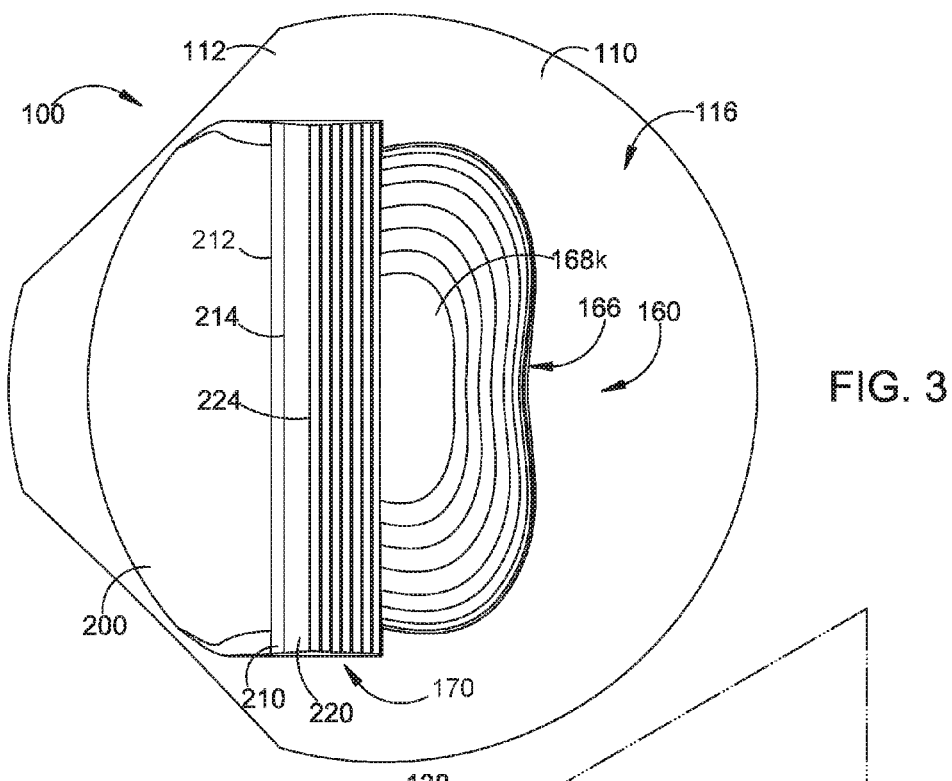
FIG. 3 illustrates a bottom plan view of the lens apparatus of FIG. 1.
Figure 4:
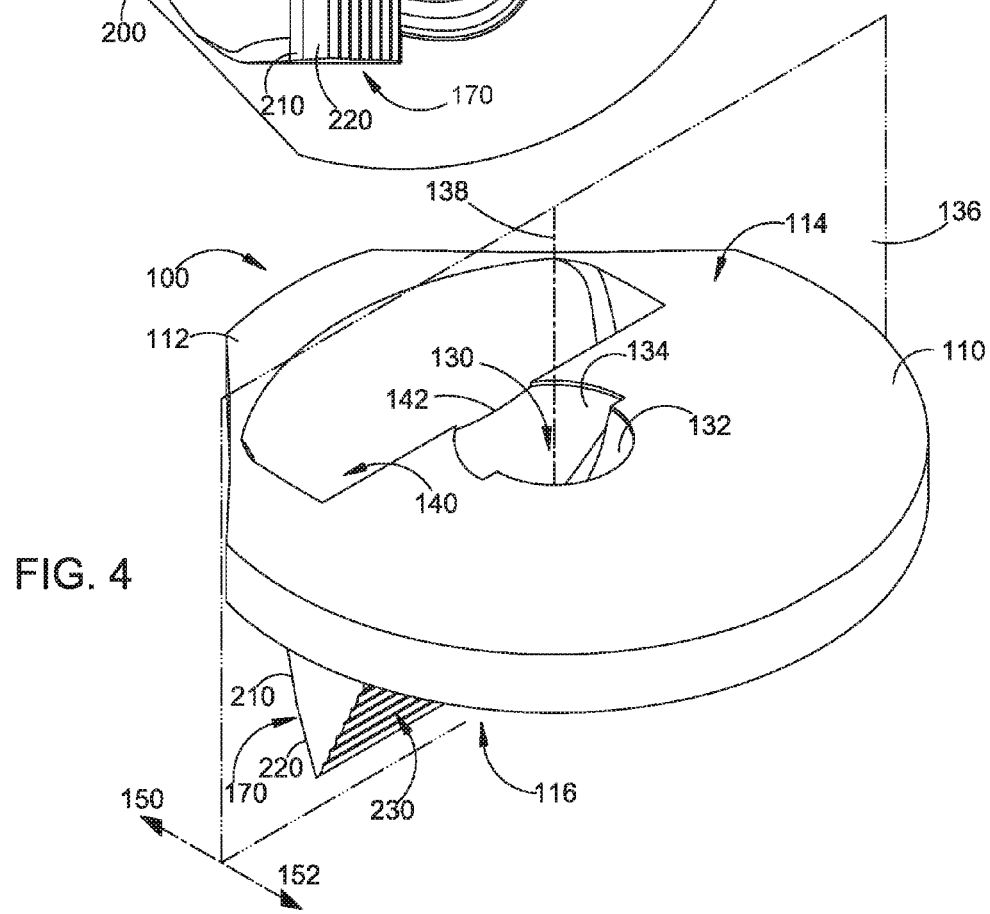
FIG. 4 illustrates a perspective view of the lens apparatus of FIG. 1 looking down at the front (proximal portion) of the input side of the lens apparatus, the view in FIG. 4 further showing a lens optical plane (transverse reference plane) in phantom.
Figure 5:
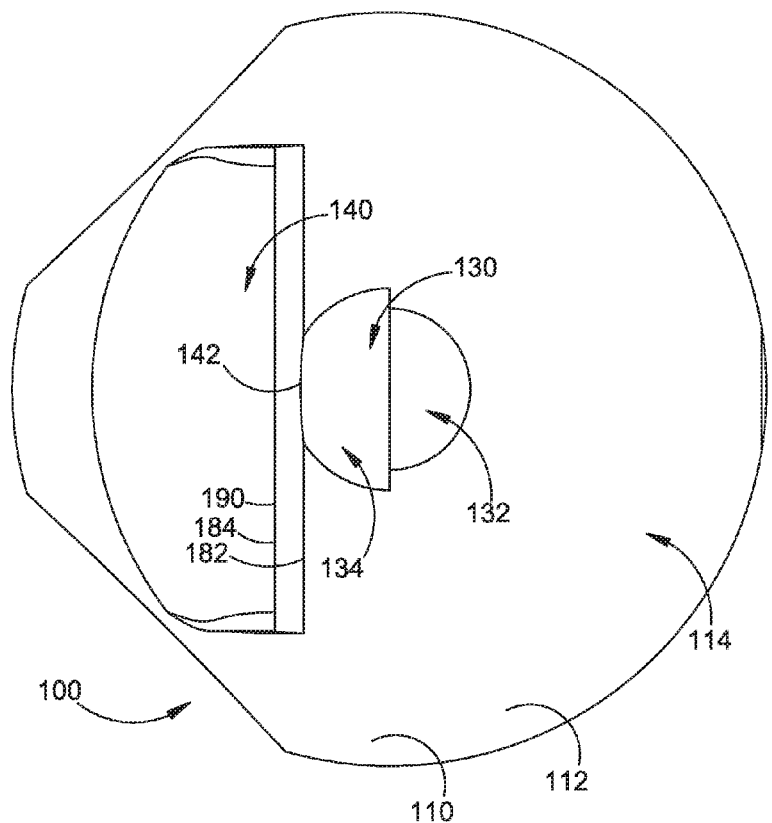
FIG. 5 illustrates a top plan view of the lens apparatus of FIG. 1.
Figure 6:
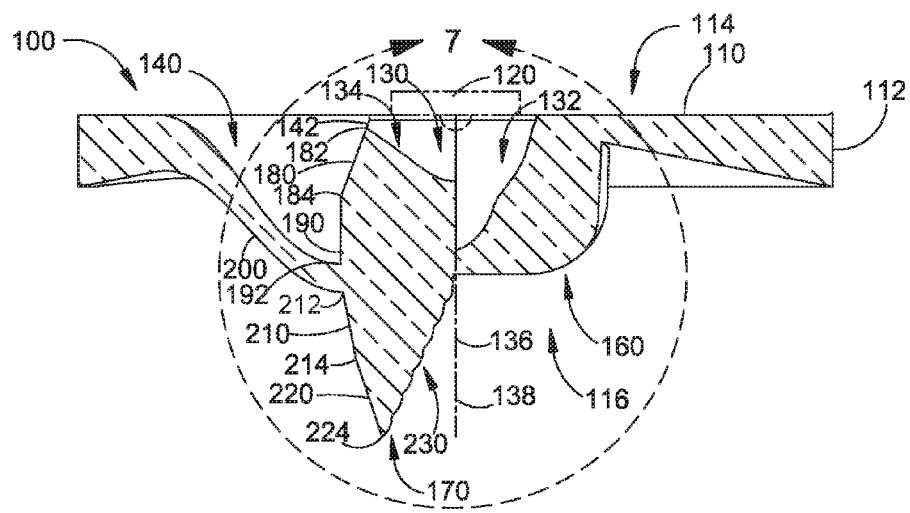
FIG. 6 illustrates a cross-sectional Elevational view of the lens apparatus of FIG. 1 taken along the section line 6-6 in FIG. 1, the cross-sectional view further showing a desired dark region and a desired illumination region separated by the lens optical plane.
Figure 7:
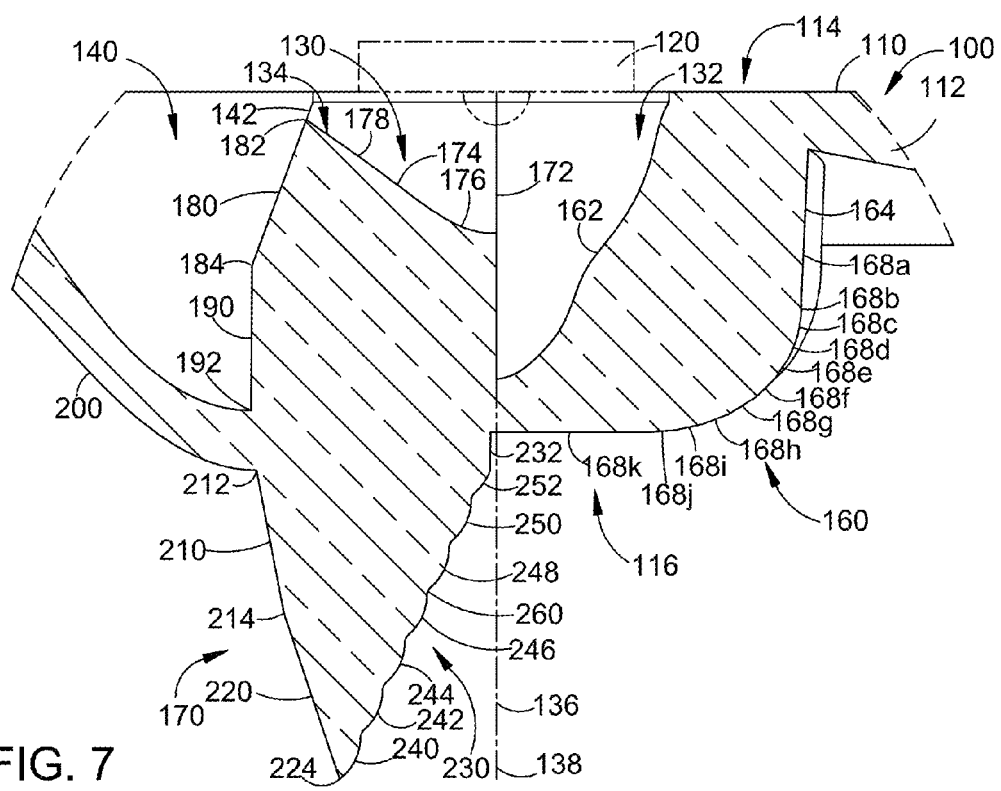
FIG. 7 illustrates an enlarged cross-sectional view of the lens apparatus of FIG. 1 taken within the area bounded by the circle—7—in FIG. 6.

FIG. 1 illustrates a lower perspective view of an embodiment of an optical lens apparatus 100 for asymmetrically distributing light in an area looking up toward the front (proximal) portion of the apparatus. FIG. 2 illustrates a lower perspective view of the lens apparatus looking up toward the rear (distal) portion of the apparatus. FIG. 3 illustrates a bottom plan view of the lens apparatus. FIG. 4 illustrates an upper perspective view of the apparatus looking toward the front of the apparatus. FIG. 5 illustrates a top plan view of the apparatus. FIG. 6 illustrates a cross-sectional view of the embodiment of FIGS. 1-5 taken along the section line 6-6 in FIG. 1. FIG. 7 illustrates an enlarged cross-sectional view of the embodiment of FIGS. 1-6 taken within the area 7-7 in FIG. 6.

As described below, the optical lens apparatus of FIGS. 1-7 is generally configured to be positioned on or near a light emitter such as a lamp, bulb, light-emitting diode (LED) or other suitable light emitter. The optical lens apparatus disclosed herein may be used with a light emitter in various applications, such as overhead lighting, street lighting, vehicle lighting, indoor lighting, outdoor lighting, or other lighting applications requiring asymmetric light distribution.

The lens apparatus 100 of FIGS. 1-7 comprises a lens body 110 having a base 112. The base may be used to mount the lens body to a substrate (not shown) or to a lighting fixture (not shown). In the illustrated embodiment, the base is part of a larger substrate, and only the portions of the base immediately surrounding the lens body are shown.

The lens body 110 comprises an input side 114 and an output side 116. The input side receives light from a light source, such as a light-emitting diode (LED) 120 (shown in phantom in FIGS. 6 and 7). As shown in FIGS. 4 and 5, the input side of the lens body includes an emitter recess 130 to receive the light from the light source. The emitter recess comprises a first emitter recess region 132 and a second emitter region 134 that are separated by a lens optical plane 136 (FIG. 4) that passes through the center of the LED. The lens optical plane is shown in perspective in FIG. 4 and is shown as a single line representing the edge of the plane in FIGS. 5-7. The lens optical plane is also referred to herein as the transverse reference plane. An optical axis 138 is normal to the LED and lies in the lens optical plane and is coincident with the edge of the lens optical plane in FIGS. 4,6 and 7.

As shown in FIGS. 4 and 5, the first emitter recess region 132 and the second emitter recess region 134 are generally semicircular at the input side, with the second emitter recess region having a larger diameter than the first recess region. Both emitter recess regions extend into the base 112 of the lens body 110. As shown in FIG. 6, the second emitter recess region has a flattened arcuate profile within the lens body and extends less distance into the lens body than the radius at the input side. In contrast, the first emitter recess region extends approximately twice the distance into the lens body. The first emitter recess region has a generally right-triangular profile, which represents a three-dimensional right circular cone within the lens body. The cone is truncated (bisected) at the lens optical plane. Rather than being a straight line, the hypotenuse of the triangular profile (the revolved surface of the cone) comprises a plurality of alternating concave and convex surfaces. The first emitter recess region is completely semicircular at the input side. In contrast, the input side of the second emitter recess region is not completely circular. Rather, the perimeter of the input side of the second emitter recess region extends to a cavity 140. A boundary 142 of the cavity defines a straight boundary of the second emitter recess region, which corresponds to a chord of the semicircular input side of the region. Thus, the semicircular shape of second emitter recess region at the input side is truncated at the boundary.

The output side 116 of the lens body 110 in FIGS. 1-7 has a complex geometric shape to cause light from the light source 120 to be distributed into the environment to create a selected illumination pattern. In particular, as described below, a desired dark region 150 (FIGS. 4 and 8-14) receives a very small portion of the light emitted by the light source, and a desired illumination region 152 (FIGS. 4 and 8-14) receives a substantially larger portion of the light from the light source. In general, the desired dark region and the desired illumination region are separated by the lens optical plane 136; however, it should be understood that the separation between the desired dark region and the desired illumination region may occur in another plane parallel to the lens optical plane. In one intended application of the lighting apparatus disclosed herein, the desired illumination region is on the street side of an overhead outdoor lighting system, and the desired dark region is on the residence or business side of the light system such that most of the light generated by the lighting apparatus is directed toward the street and away from residences and businesses. The street (desired illumination region) side is also referred to herein as the proximal side; and the residence or business (desired dark region) side is also referred to as the distal side.

The output side 116 of the lens body 110 includes a primary refractive structure 160 that lies on one side of the lens optical plane 136 toward the desired illumination region 152. The primary refractive structure comprises glass or other optical material. The primary refractive structure has an inner surface 162 (FIG. 7) that corresponds to the outer boundary of the first emitter recess region 132. The primary refractive region has an outer surface 164 (FIG. 7) that has a flattened dome-like shape. As illustrated in FIG. 3, the outer surface has an elongated shape with an indentation 166 at the base of the refractive surface. In the illustrated embodiment, the outer surface may comprise a plurality of contoured facets 168a-168k as shown, with the uppermost facet 168a being substantially vertical and with the lowermost facet 168k forming a flat (e.g., horizontal) lower portion of the outer surface. In alternative embodiments, the facets other than the uppermost and lowermost facets may be replaced with spine curves to provide a smooth outer surface. The primary refractive structure has a height of approximately 5.40 millimeters from the base 112 to the flat upper portion of the outer surface. As shown in FIG. 6, a portion of the base surrounding the primary refractive structure is concave in the illustrated embodiment.

The primary refractive structure 160 extends to the lens optical plane 136 and abuts a protruding lens structure 170 that extends from the lens optical plane toward the desired dark region 150. As shown in FIGS. 1, 2, 4, 6 and 7, the protruding lens structure has a general appearance like a fin or tooth and extends upward from the boundary of the second emitter recess region 134 to a height of approximately 6.63 millimeters above the lowermost facet (horizontal surface) 168k of the primary refractive structure. The protruding lens structure has a first substantially vertical boundary portion 172 that is generally coextensive with the lens optical plane and terminates at the intersection of the lens optical plane with the outer surface 164 of the primary refractive structure. The protruding lens structure comprises glass or other optical material.

The protruding lens structure has an input surface 174 that corresponds to the boundary of the second emitter recess region 134. As illustrated, the input surface has a first concave portion 176 closer to the lens optical plane 136 and has a second slightly convex portion 178 closer to the boundary 142 with the cavity 140.

The protruding lens structure 170 has a first total internal reflection (TIR) surface 180 that is displaced at a first end (or edge in three dimensions) 182 from the lens optical plane 136 by the truncated diameter of the second emitter recess region 134. The first TIR surface extends away from the input surface to second end (or edge) 184 (see FIG. 5 also), which is displaced from the lens optical plane by a greater distance such that first TIR surface slopes away from the lens optical plane as shown in FIG. 6. In the illustrated embodiment, the first TIR surface slopes away from the lens optical plane at an angle of approximately 20.5 degrees.

The protruding lens structure 170 has a second TIR surface 190, which has first end (or edge) which is also the second end (or edge) 184 of the first TIR surface 180. The second TIR structure extends to a respective second end (or edge) 192 as shown in FIGS. 6 and 7. The second TIR surface is approximately vertical and thus is approximately parallel to the lens optical plane 136. In the illustrated embodiment, the second TIR surface drafts slightly (less than 0.5 degree) away from the lens optical plane to facilitate the manufacturing of the lens body 110 by injection molding.

A bridge structure 200 (described below) separates the second TIR surface 190 from a third TIR surface 210 of the protruding lens structure 170. The third TIR surface extends from a first end (or edge) 212 at the intersection with the bridge structure to a second end (or edge) 214. The second end of the third TIR surface is closer to the lens optical plane 136 than the first end. Thus, the third TIR surface slopes toward the lens optical plane. In the illustrated embodiment, the third TIR surface slopes toward the lens optical plane at an angle of approximately 10.8 degrees.

The protruding lens structure 170 has a fourth TIR surface 220, which has first end (or edge), which is also the second end (or edge) 214 of the third TIR surface 210. The fourth TIR structure extends to a respective second end (or edge) 224 as shown in FIGS. 6 and 7. The second end of the fourth TIR surface is also the apex of the protruding lens structure. The second end of the fourth TIR surface is closer to the lens optical plane 136 than the first end. Thus, the fourth TIR surface slopes toward the lens optical plane. In the illustrated embodiment, the fourth TIR surface slopes toward the lens optical plane at an angle of approximately 18.5 degrees.

The bridge structure 200 of the protruding lens structure 170 separates the first TIR surface 180 and the second TIR surface 190 from the third TIR surface 210 and the fourth TIR surface 220. The first and second TIR surfaces draft outwardly from the lens optical plane 136, which causes the first and second TIR surfaces to draft inwardly with respect to the input side 114 of the lens body 112. The third and fourth TIR surfaces draft inwardly from the lens optical plane, which causes the third and fourth TIR surfaces to draft inwardly with respect to the output side 116 of the lens body. The bridge structure is also separated from the first and second TIR surfaces by the cavity 140, which has a roughly triangular cross-sectional profile. The inner surfaces of the cavity draft inwardly with respect to the input side of the lens body 112. Using the bridge to separate the surfaces that draft inwardly from the input side from the surfaces that draft inwardly from the output side allows the entire lens structure 100 to be molded as a single unitary body using conventional split mold casting techniques. In particular, the overall structure has no undercuts and therefore can be manufactured using straight-pull injection molding techniques.

The protruding lens structure 170 further includes a forward facing refractive surface 230, which is directed toward the proximal side (street-facing side) of the lens body 112. The protruding lens structure is shown in more detail in the enlarged cross-sectional view of FIG. 7. The forward facing refractive (proximal side) surface of the protruding lens structure extends from the apex 224 of the protruding lens structure toward the intersection of the protruding lens structure with the primary refractive structure 160. The forward facing refractive surface starting at the apex slopes toward the lens optical plane 136 at an overall angle of approximately 25 degrees in the illustrated embodiment. The forward facing refractive surface terminates at a vertical portion 232 (FIG. 7) of the protruding lens structure positioned a short distance away from the lens optical plane on the opposite side of the lens optical plane from the primary refractive structure (e.g., on the distal side of the lens optical plane).

The forward facing refractive surface 230 comprises a plurality of convex refractive ridges comprising a first ridge 240, a second ridge 242, a third ridge 244, a fourth ridge 246, a fifth ridge 248, a sixth ridge 250, and a seventh ridge 252 (e.g., 7 ridges in the illustrated embodiment). Adjacent ridges are interconnected by concave fillets (or valleys) 260 (only one identified in FIG. 7). The overall angle of the forward facing refractive surface is defined by a line interconnecting the intersections of the ridges and the valleys. In the illustrated embodiment, each of the second through sixth ridges comprises a circular arc having a radius of approximately 1 millimeter and has an angular span of approximately 45.23 degrees. The first ridge has a similar radius but an angular span of approximately 52.62 degrees. The seventh ridge has a radius of approximately 1.1 millimeter and an angular span of approximately 26.81 degrees. Each fillet has a radius of approximately 0.2 millimeter and has an angular span of approximately 49.23 degrees. As described above, the arc lengths of the convex ridges are significantly greater than the arc lengths of the concave valleys. For example, the arc length of each valley is approximately 0.17 millimeter. The arc length of each of the second through sixth ridges is approximately 0.79 millimeter. The arc length of the first ridge is approximately 0.92 millimeter. The arc length of the seventh ridge is approximately 0.51 millimeter. Accordingly, the arc length of the first ridge is approximately 5.3 times the arc lengths of the valleys; the arc length of each of the second through sixth ridges is approximately 4.6 times the arc lengths of the valleys; and the arc length of the seventh ridge is approximately 3 times the arc lengths of the valleys. Thus, the forward facing surface primarily comprises convex refractive surfaces. In the illustrated embodiment, the total arc length of the convex surfaces of the ridges is 5.38 (approximately 5.4) times the total arc length of concave surfaces of the valleys.

Figure 8:
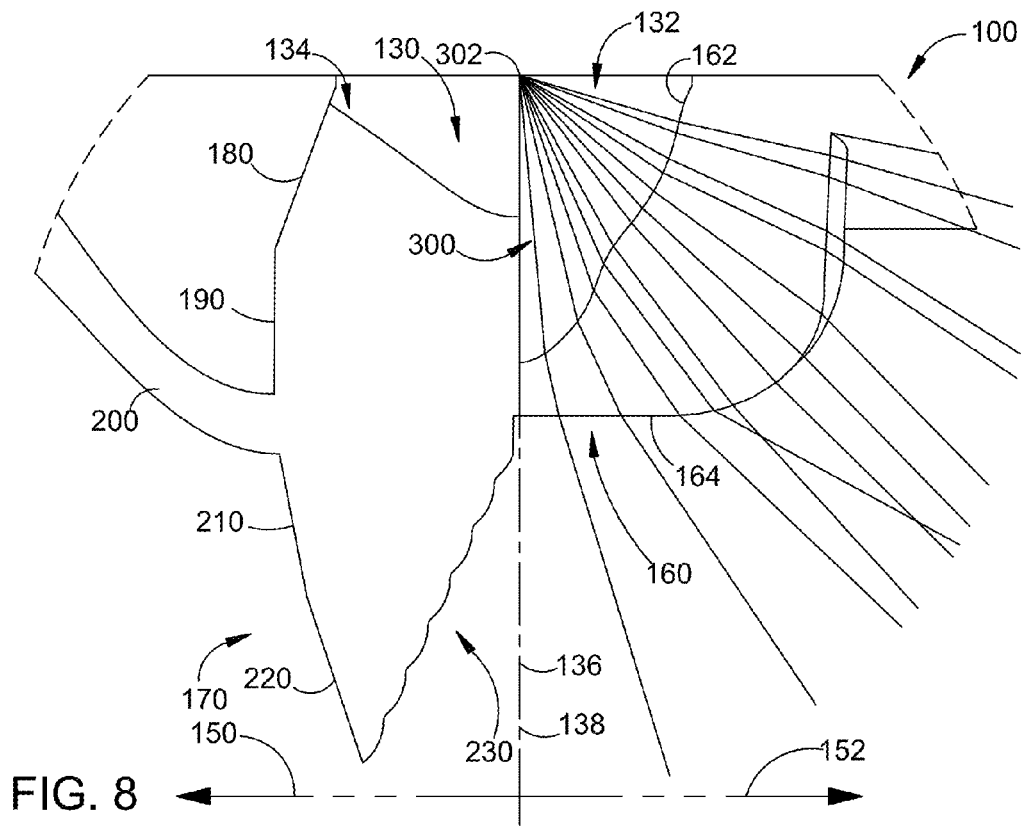
FIG. 8 illustrates the enlarged cross-sectional view of FIG. 7 with a plurality of light paths showing refraction of the rays from the first emitter recess region by the primary refraction structure to direct the refracted rays toward the desired illumination region.

The inner surface 162 and the outer surface 164 of the primary refractive structure 160 and the optical material of the lens body 110 between the two surfaces function together as a refractive lens. As illustrated in FIG. 8, the inner surface of the primary refractive structure receives light emitted from the light source 120 (see FIG. 7) into the first emitter recess region 132. The light is illustrated as a plurality of ray traces 300 which emanate from a common center 302 where the lens optical axis 138 intersects the light source. Additional rays emanating from other portions of the light source other than the common center may also enter the first emitter region 132. The additional rays are not illustrated in FIG. 8 or in the other figures described below. In FIG. 8 and in the following figures, the illustrated rays are only representative of a continuum of actual rays that are emitted from the light source. The air-to-optical material boundary of the first emitter recess region that forms the inner surface of the primary optical structure is selected so that the rays from the first emitter recess region are incident on the inner surface at angles less than the critical angle with respect to the local normal so that the rays do not incur total internal reflection. The rays are first refracted at the inner surface and then pass through the body of the primary refractive structure. The rays are then incident on the optical material-to-air boundary of the outer surface at angles less than the critical angle with respect to the local normals to the surface boundary so that the rays are again refracted. Certain rays aligned with the local normal pass straight through the boundary.

As shown in FIG. 8, the refractive surfaces 162, 164 of the primary refractive structure 160 refract the light initially emitted into the first emitter recess region 132 and direct the light away from the lens optical plane 136 and away from the base 112 toward the desired illumination region 152. As a result, substantially all of the light emitted into the first emitter region is refracted by the primary refractive structure to the desired illumination region.

As shown in FIGS. 9-13, the light from the light source 120 (FIGS. 6 and 7) emitted into the second emitter recess region 134 is reflected and refracted by the surfaces of the protruding lens structure 170 in a number of ways. FIGS. 9-13 group the portions of the light emitted into the second emitter recess region in accordance with the light paths followed by the rays representing the light.

FIG. 9 illustrates the paths followed by a first group 310 of light rays emanated into the second emitter recess region 134 within a first range 312 of angles with respect to the lens optical plane 136. In the illustrated embodiments, the first range of angles extends from approximately 58 degrees to approximately 80 degrees with respect to the lens optical plane. The rays in the first group are refracted by a small amount at the air-glass boundary of the input surface 174 of the protruding lens structure 170 and are then directed toward the first TIR surface 180. The rays in the first group are totally internally reflected at the glass-air boundary of the first TIR surface and are directed toward the forward facing refractive surface 230 comprising the plurality of ridges 240, 242, 244, 246, 248, 250, 252 (numbered in FIG. 7) and valleys 260. The rays in the first group are refracted at the glass-air boundaries of the ridges and valleys and exit from the forward facing refractive surface in directions toward the desired illumination region 152.

FIG. 10 illustrates the paths followed by a second group 320 of light rays are initially emitted into the second emitter region 134 within a second range 322 of angles with respect to the lens optical plane 136. In the illustrated embodiments, the second range of angles extends from approximately 39 degrees to approximately 58 degrees with respect to the lens optical plane. The rays in the second group are refracted by a small amount at the air-glass boundary of the input surface 174 of the protruding lens structure 170 and are directed toward the second TIR surface 190. The rays in the second group are totally internally reflected at the glass-air boundary of the second TIR surface and are directed toward the ridges and valleys of the forward facing refractive surface 230. The rays in the second group are refracted at the glass-air boundaries of the ridges and valleys and exit from the forward facing refractive surface in directions toward the desired illumination region 152.

Figure 11:
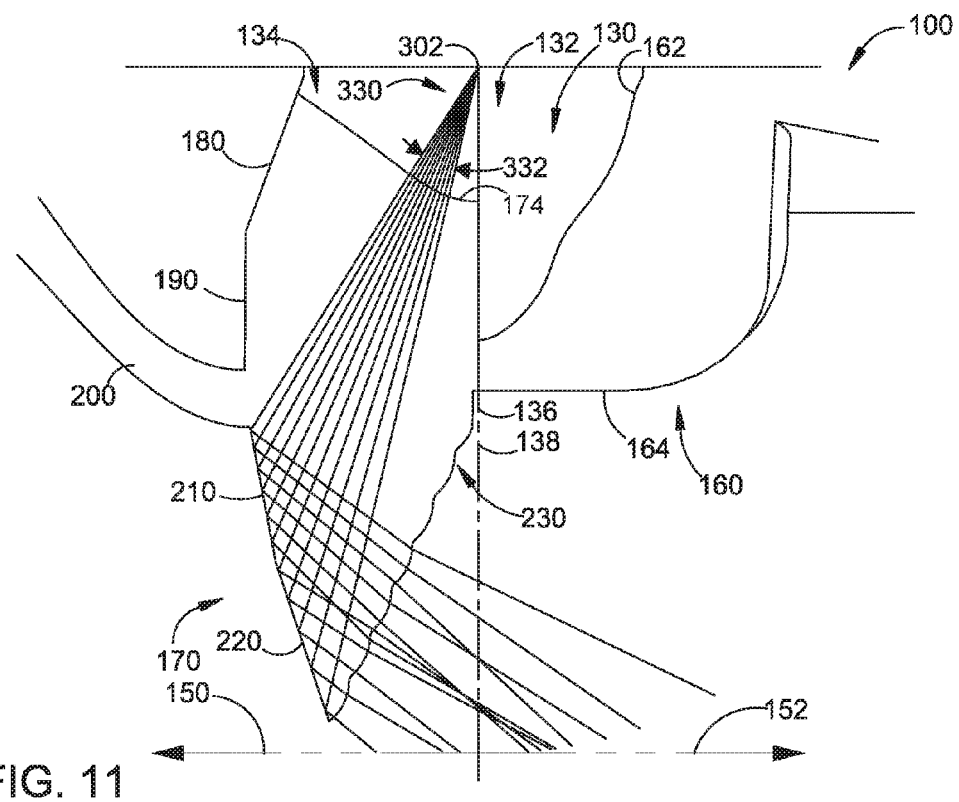
FIG. 11 illustrates the enlarged cross-sectional view of FIG. 7 with a plurality of light path paths representing a third set of rays from the second emitter recess region, the light paths showing total internal reflection of the third set of rays by the third and fourth total internal reflection surfaces in the protruding lens structure and refraction of the third set of rays by the plurality of refractive elements on the secondary refractive surface.

FIG. 11 illustrates the paths followed by a third group 330 of light rays are initially emitted into the second emitter region 134 within a third range 332 of angles with respect to the lens optical plane 136. In the illustrated embodiments, the third range of angles extends from approximately 12 degrees to approximately 34 degrees with respect to the lens optical plane. The rays in the second group are refracted by a small amount at the air-glass boundary of the input surface 174 of the protruding lens structure 170 and are directed toward the third TIR surface 210 and the fourth TIR surface 220. The rays in the third group are totally internally reflected at the glass-air boundary of the third and fourth TIR surfaces and are directed toward the ridges and valleys of the forward facing refractive surface 230. The rays in the third group are refracted at the glass-air boundaries of the ridges and valleys and exit from the forward facing refractive surface in directions toward the desired illumination region 152.

Figure 12:
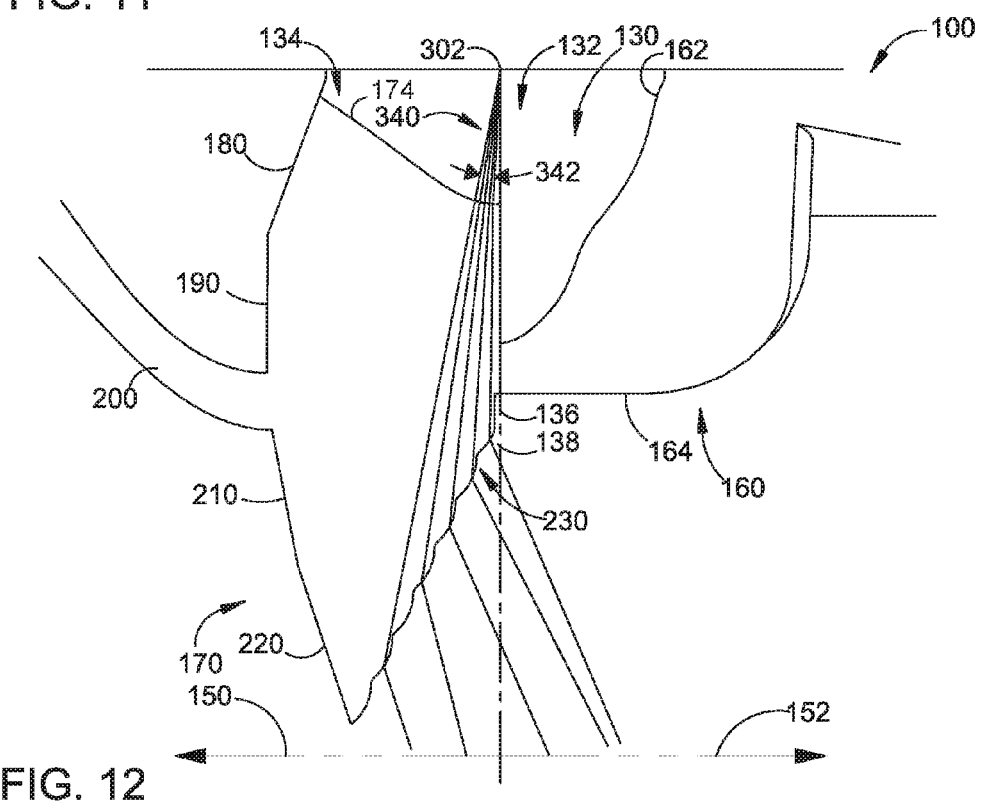
FIG. 12 illustrates the enlarged cross-sectional view of FIG. 7 with a plurality light paths representing a fourth set of rays from the second emitter recess region, the fourth set of light rays being incident directly onto the plurality of refractive elements on the secondary refractive surface and being refracted to the desired illumination region.

FIG. 12 illustrates the paths followed by a fourth group 340 of light rays initially emitted into the second emitter region 134 within a fourth range 342 of angles with respect to the lens optical plane 136. In the illustrated embodiments, the fourth range of angles extends from approximately 2 degrees to approximately 12 degrees with respect to the lens optical plane. The rays in the fourth group are refracted by a small amount at the air-glass boundary of the input surface 174 of the protruding lens structure 170 and are directed toward the ridges and valleys of the forward facing refractive surface 230. The rays in the fourth group are refracted at the glass-air boundaries of the ridges and valleys and exit from the forward facing refractive surface in directions toward the desired illumination region 152.

Figure 13:
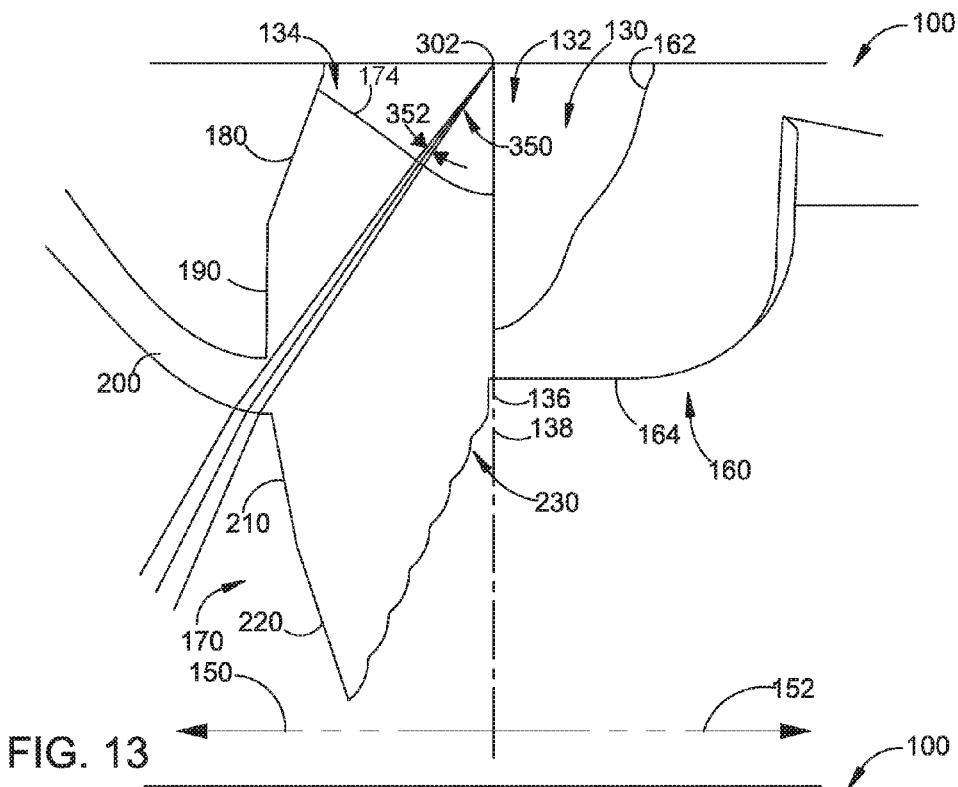
FIG. 13 illustrates the enlarged cross-sectional view of FIG. 7 with a plurality of light paths representing a fifth set of rays from the second emitter recess region, the fifth set of rays being refracted by the bridge structure to direct the fifth set of rays toward the desired dark region.

FIG. 13 illustrates the paths followed by a fifth group 350 of light rays emanated into the second emitter region 134 within a fifth range 352 of angles with respect to the lens optical plane 136. The fifth range of angles lies between the second range of angles and the third range of angles. In the illustrated embodiments, the first range of angles extends from approximately 34 degrees to approximately 39 degrees with respect to the lens optical plane. The rays in the fifth group are refracted by a small amount at the air-glass boundary of the input surface 174 of the protruding lens structure 170 and are directed to locations between the second TIR surface 190 and the third TIR surface 210. Thus, the rays in the fifth group enter the bridge structure 200 and are refracted when the rays exit the bridge structure. The rays in the fifth group exit from the bridge structure and are directed toward the desired dark region 150.

Figure 14:
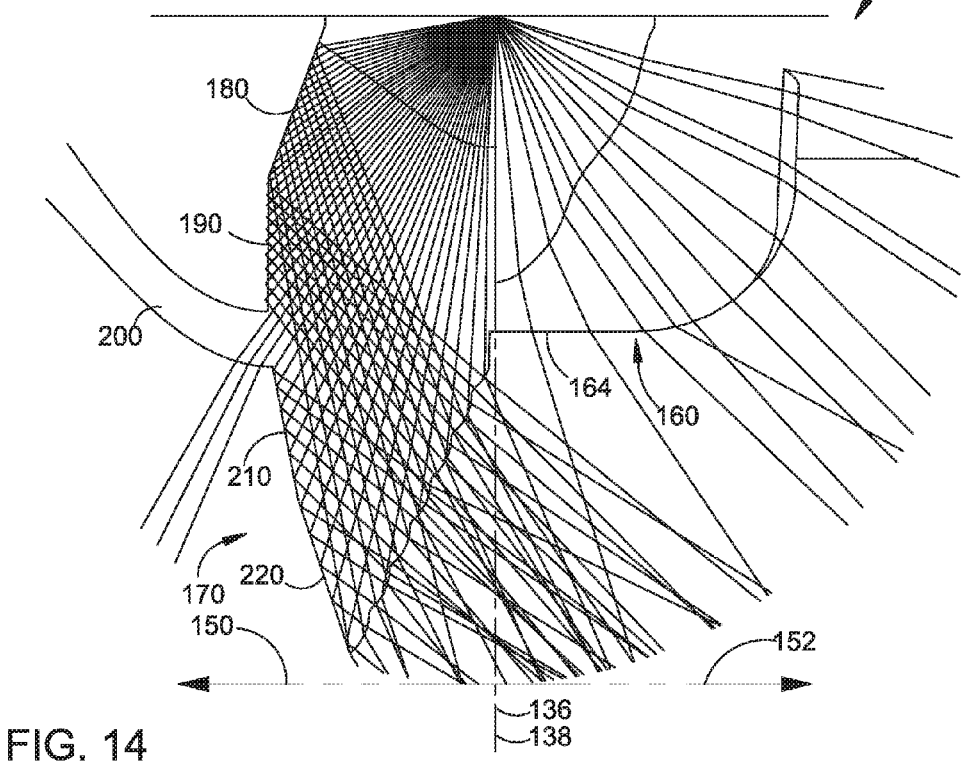
FIG. 14 illustrates the enlarged cross-sectional view of FIG. 7 with a plurality of light paths representing the combined effect of the first though fifth sets of rays from the first emitter recess region and the second emitter recess region, the five sets of rays being primarily directed to the desired illumination region with a relatively small portion of the rays emanating from the bridge structure toward the desired dark region.
Figure 15:
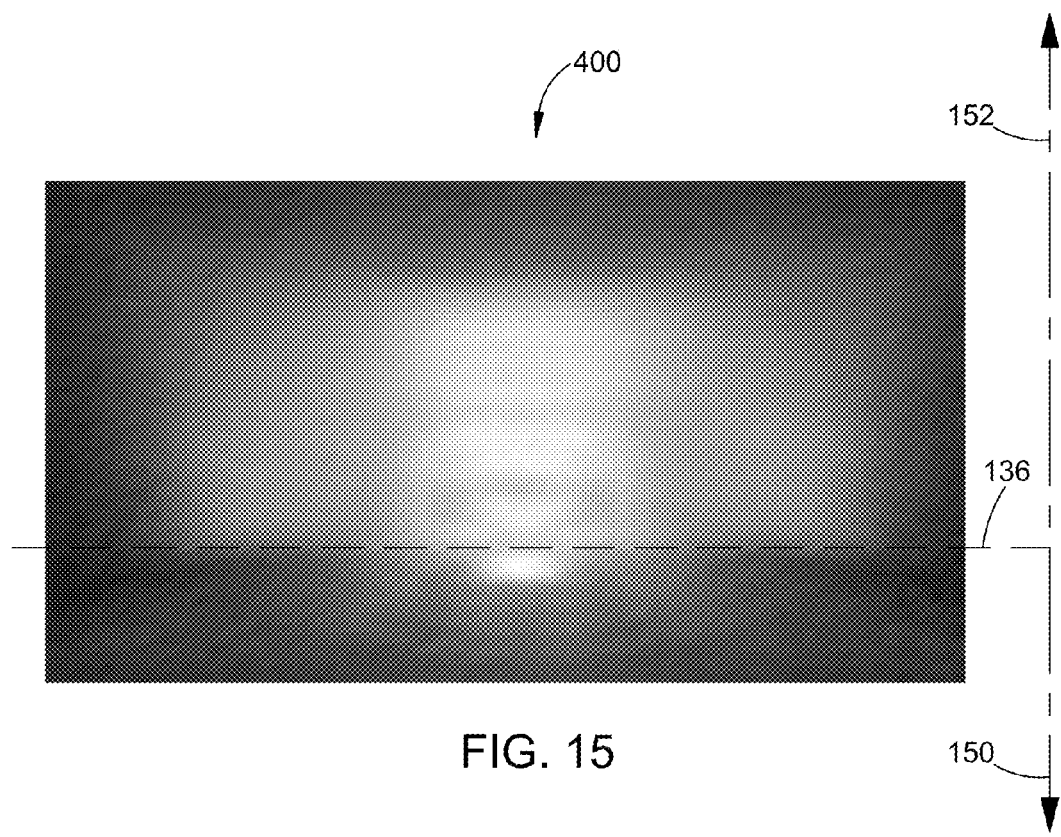
FIG. 15 illustrates the optical effect of the lens apparatus of FIGS. 1-7 showing a much greater portion of the light emitted toward the desired illumination region and a much small portion of the light emitted toward the desired dark region.

FIG. 14 illustrates the combined paths followed by the light rays refracted by the primary refractive structure 160 and the five groups of light rays reflected and refracted by the protruding lens structure 170. As illustrated, a much greater portion of the light rays are directed to the desired illumination region 152 and a much smaller portion of the light rays are directed to the desired dark region 150. In the actual physical embodiment, additional small portions of light rays may be directed to the desired dark region; however, the overall quantity of light directed to the desired dark region is very small compared to the quantity of light directed to the desired illumination region. The relative quantities of light directed to the two regions are illustrated by an illumination pattern 400 in FIG. 15, which shows that the brightness and the coverage area of the light in the desired illumination region (above the dashed line in FIG. 15) are both much greater than the brightness and the coverage area of the light in the desired dark region (below the dashed line in FIG. 15).

Figure 16:
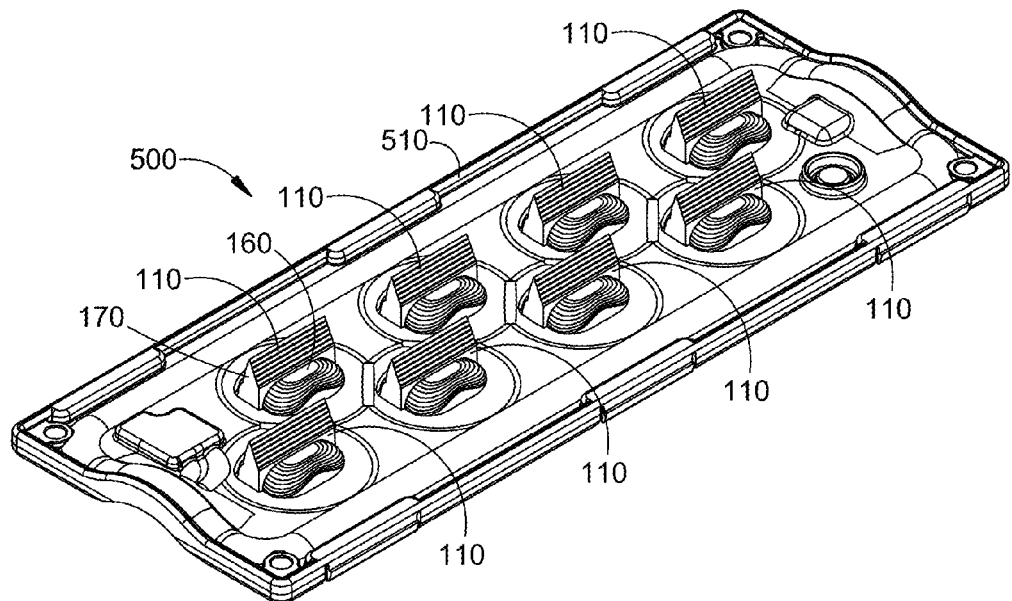
FIG. 16 illustrates a lower perspective view of a multiple lens configuration comprising a plurality of the lens bodies of FIGS. 1-7 mounted on a common platform.
Figure 17:
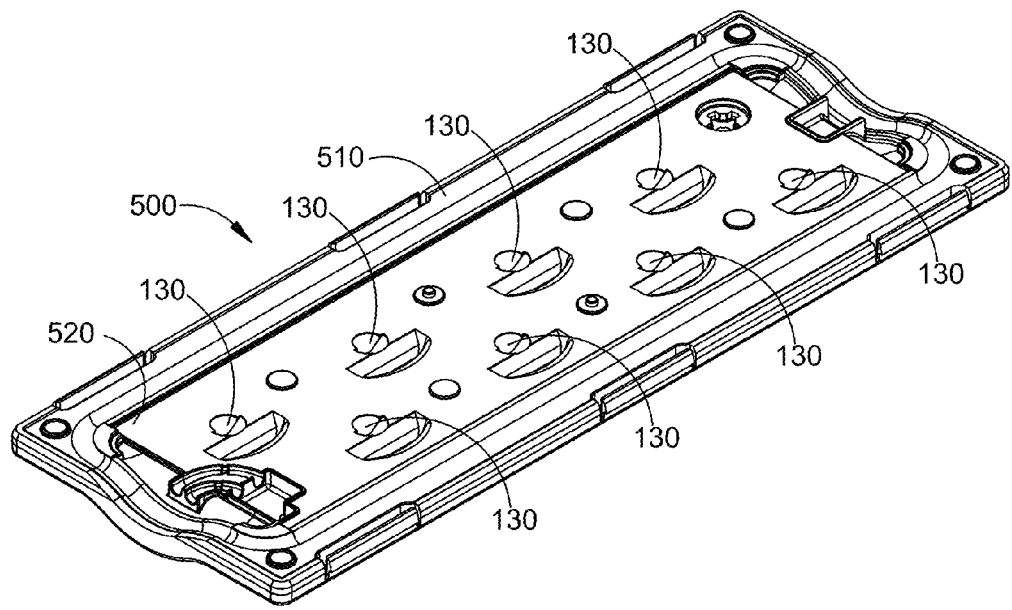
FIG. 17 illustrates an upper perspective view of the multiple lens configuration of FIG. 16.

FIGS. 16 and 17 illustrate lower perspective views and upper perspective views, respectively, of a generally rectangular multiple-lens configuration 500 comprising a common mounting platform 510 onto which are mounted a plurality (e.g., 8 in the illustrated embodiment) of the lens bodies 110 of FIGS. 1-7. The lens bodies are mounted in a staggered array with the respective primary refractive structures 160 and protruding lens structures 170 oriented in the same direction. As illustrated in the top view in FIG. 17, each lens body includes a respective emitter recess 130 that receives a respective emitter (not shown) mounted on an electronics panel (not shown) that fits within a generally rectangular recess 520 on the bottom surface. When the panel is inserted into the recess, the emitters (e.g., the LEDs 120 shown in FIGS. 6 and 7) are aligned with the emitter recesses. In the illustrated embodiment, the common mounting platform and the lens bodies are manufactured as a single integral unit by injection molding. The mounting platform is installable in a suitable weather-tight mounting enclosure and electrically connectable to a source of electrical power to provide directional lighting.

Although particular embodiments of a new and useful Proximal Shape Configurations for an Asymmetric Area Lighting Lens have been described herein, it is not intended that such references be construed as limitations upon the scope of this invention except as set forth in the following claims.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. An optical lens apparatus for distributing light from a light emitter, comprising:
   a lens body having an input side and an output side, the input side of the lens body positionable to receive light from the light emitter, the light from the light emitter including at least first and second portions of light, the first portion of light initially directed into a first region of the lens body and the second portion of light initially directed into a second region of the lens body;
   a first refractive output surface positioned on the output side of the first region of the lens body, the first refractive output surface refracting the first portion of the light from the light emitter to direct the first portion of the light to a desired illumination region; and
   a total internal reflection surface positioned on the output side of the second region of the lens body, the total internal reflection surface reflecting the second portion of the light from the light emitter;
   a second refractive output surface positioned on the output side of the second region of the lens body, the second refractive surface comprising a plurality of refractive elements, the refractive elements of the second refractive surface receiving the second portion of light reflected by the total internal reflection surface and refracting the second portion of light to the desired illumination region;

wherein the plurality of refractive elements comprise a plurality of spaced apart arcuate convex elements with a respective concave element positioned between adjacent arcuate convex elements; and wherein the plurality of refractive elements comprise seven convex refractive elements and six concave refractive elements, and the convex refractive elements have a total arc length that is approximately 5.4 times a total arc length of the concave refractive elements.

2. The apparatus of claim 1, wherein the total internal reflection surface comprises a plurality of substantially planar adjacent longitudinal faces.

3. The apparatus of claim 1, further comprising:
an emitter recess formed in the input side of the lens body;
the lens body including a primary emission axis aligned with the emitter when the emitter is installed in the emitter recess; and
a transverse reference plane extending through the primary emission axis, the transverse reference plane having a first side and a second side, the first region of the lens body being on the first side of the transverse reference plane and the second region of the lens body being on the second side of the transverse reference plane;
wherein:
the desired illumination region is located on the first side of the reference plane, and wherein a desired dark region is located on the second side of the reference plane, and
the total internal reflection surface and the second refractive surface are positioned entirely in the desired dark region on the second side of the reference plane.

4. The apparatus of claim 3, wherein the lens body is operable to distribute a substantial portion of the transmitted light from the emitter recess into the desired illumination region.

5. The apparatus of claim 1, wherein the optical lens apparatus comprises a plurality of the lens bodies mounted on a common lens support platform, each of the lens bodies positioned to direct light toward the desired illumination region.

6. A lighting apparatus for distributing light asymmetrically into an environment toward a desired illumination region and away from a desired dark region, the apparatus comprising:
a light-emitting diode (LED) emitter having a primary emission axis;
an optical lens positioned on the emitter such that the primary emission axis extends through the optical lens, the optical lens having a transverse reference plane parallel to the primary emission axis, the transverse reference plane having a first side and a second side, the optical lens including a first refractive surface on the first side of the transverse reference plane and including a total internal reflection surface on the second side of the transverse reference plane; and
wherein:
the total internal reflection surface is configured to reflect light incident on the total internal reflection surface;
the optical lens includes a second refractive surface on the second side of the transverse reference plane, the second refractive surface comprising a plurality of refractive elements;
light reflected by the total reflective surface is refracted by the refractive elements of the second refractive surface toward the desired illumination region; and
the desired illumination region is on the first side of the transverse reference plane and wherein the desired dark region is on the second side of the transverse reference plane; and
wherein:
the total internal reflection surface includes at least two substantially planar longitudinal faces;
the plurality of refractive elements comprise a plurality of convex ridges; and
adjacent convex ridges are spaced apart by a respective concave valley, the diameters and angular spans of the ridges and valleys selected such that the ridges have a total longer arc length that is longer than a total arc length of the valleys.

7. The apparatus of claim 6, wherein the total arc length of the ridges is at least five times the total arc length of the valleys.

* * * * *